Patented Dec. 19, 1922.

1,439,188

UNITED STATES PATENT OFFICE.

LOUIS D. POOCK, OF DAYTON, OHIO.

FERTILIZER AND PROCESS OF PRODUCING THE SAME.

No Drawing. Application filed January 26, 1922. Serial No. 532,006.

*To all whom it may concern:*

Be it known that I, LOUIS DANIEL POOCK, a citizen of the United States, residing at Dayton, in the county of Montgomery and State of Ohio, have invented certain new and useful Improvements in Fertilizers and Processes of Producing the Same, of which the following is a specification.

This invention relates to an improved fertilizer compound and certain by-products, as also to the process by which such compound is produced and from which the by-products result.

The first branch of my invention consists of a fertilizing compound produced from deciduous leaves of trees taken after they have fallen and treated to a certain process; and the second branch of my invention consists of this process by which such leaves are treated to produce such fertilizing compound. And incidentally my invention includes also certain by-products which result from such process treatment of the leaves.

As the nature of my compound and its ingredients will best appear from a statement of the process, and as a description of the compound and the nature of its components will necessarily involve more or less of a statement of the process itself, I will set forth both the compound and the process concurrently.

I gather deciduous leaves, leaves which at a certain stage of growth fall from their trees, at which time they are in more or less dry state, though not actually dry or crisp. These leaves I reduce either by cutting or granulating them, as by a mill, into small particles. This mass of the granulated leaves I mix with water in about the proportions of two gallons of water to one pound of leaves. This mixture I subject to heat sufficient to cause the leaves to steep—preferably at about the temperature of 135 degrees Fahrenheit. After they have steeped long enough to produce an infusion or extraction of the ingredients of the leaves I relieve the mass from heat and permit it to cool off. After the mixture has cooled I add a leavening substance, such as bakers' yeast, for instance, in the proportion of about two ounces to each gallon of water. I then allow the mixture to ferment, which occupies a period varying from ten to twenty days according to the season of the year and to weather conditions and during the course of fermentation I skim off the mold, scum, etc. After the mixture has fermented I drain off the liquid from the remaining solid particles of the leaves. I then add a preservative to the liquid, such as sodium benzoate, about one teaspoonful to the gallon of liquid.

I now have a valuable and effective liquid fertilizer which by analysis has been shown to contain nitrogen, potash and phosphoric acid, elements of plant food. This liquid fertilizer acts quickly and effectively and is readily taken up by the plants.

By extending my process somewhat further I produce a by-product in the form of a mulch fertilizer comprised of the granulated leaves left over after the liquid has been extracted with the addition of as much of the liquid poured back on the leaves as they will absorb. This by-product therefore produces a fertilizer in mulch form.

A second by-product I produce by drying the granulated leaves left over after the liquid has been extracted. The resultant product thus obtained has some fertilizing value and adds humus to the soil, but is principally valuable for its mechanical effect in lightening up the soil by being intermixed therewith, by making the soil so treated more porous for the ready absorption of moisture and to enable the roots of some plants to more easily extend and spread without undue soil resistance.

My described liquid fertilizer contains a higher percentage of fertilizing ingredients than is found in leaf-mold made under natural conditions, as the exposure of the leaves to weather causes the loss of some of the strength of the ingredients, when leaf-mold is prepared by merely heaping the leaves into piles and allowing them to stand for long periods, usually about three to six years.

My first by-product, the fertilizing mulch contains less fertilizing value than the liquid fertilizer, but is useful and effective.

One of the important results obtained by my invention lies in the quickness with which these products are produced, particularly the liquid fertilizer, a period of from ten to twenty days, in which short time I extract from deciduous leaves fertilizing values in a quickly available form, as against waiting some 3 to 6 years to convert deciduous leaves into leaf-mold by the mere heaping of the leaves into piles, and besides I make possible these by-products described.

Having thus fully described my inven- tion, what I claim as new and desire to secure by Letters Patent, is:—

1. A liquid fertilizer composed of water containing the extract of deciduous leaves and a leavening and preservative substance.

2. The process of making a fertilizer which consists in reducing leaves to small particles, mixing them with water, subjecting the mass to heat, then cooling off and adding a leavening substance and allowing the mass to ferment, then draining off the liquid and adding a preservative ingredient to it.

3. The process of making a fertilizer from deciduous leaves which consists in reducing the leaves to small particles, steeping them in water in about the proportions of one pound of such leaves to two gallons of water, heating the mass to about 135 degrees F. long enough to produce an infusion, then allowing the mass to cool, adding a leavening substance after cooling, then subjecting the mass to fermentation by allowing it to stand a sufficient time, drawing off the liquid and adding a preservative.

4. The process of making a fertilizer mulch of deciduous leaves which consists in reducing the leaves to small particles, mixing the leaves with water, subjecting the mass to heat, cooling the mass and adding a leavening substance, then subjecting the mass to a fermentation period, drawing off the liquid, and adding a preservative thereto, and mixing the same with the leaves to form the fertilizer.

5. The process of making a humus for application to soils consisting in reducing leaves to small pieces and mixing the leaves with water, steeping the mixture, cooling it, adding a leavening substance, subjecting the mixture to a fermentation period, then separating the leaves from the liquid and drying them.

In testimony whereof I affix my signature.

LOUIS D. POOCK.